United States Patent Office 2,865,928
Patented Dec. 23, 1958

2,865,928
RESOLUTION OF N-ACYL-DL-TRYPTOPHANS

Melvin Fields and Marcus A. Stevens, Wilmington, Del., assignors to E. I. du Pont de Nemours and Company, Wilmington, Del., a corporation of Delaware No Drawing. Application August 3, 1956
Serial No. 602,082

15 Claims. (Cl. 260—319)

This invention relates to a process for resolving N-acyl-DL—tryptophans and to new compounds obtained in practicing the method of the invention.

Tryptophan is one of the essential amino acids. Synthetic methods for producing it give tryptophan in its racemic or DL-form, which is a mixture in equal proportions of the L- and D-isomers. L-tryptophan is biologically or nutritionally active in human diets, whereas D-tryptophan is not. Various methods have been proposed for resolving racemic tryptophan, generally in the form of N-acyl derivative. Methods are known for racemizing an optically active tryptophan, or an N-acyltryptophan e. g., N-acyl-D-tryptophan. By the use of suitable resolution and racemization methods, synthetic DL-tryptophan can be converted substantially completely to the more valuable nutritionally active N-acetyl-L-tryptophan. This compound can be used as such or be converted to L-tryptophan by known methods.

Chemical methods heretofore proposed for resolving N-acyl-DL-tryptophans involve the use, for example, of quinone, brucine or 1-p-nitrophenyl-2-amino-1,3-propandiol, as the resolving agent. Such methods are generally not very practical because of the relatively high cost of such resolving agents.

It is an object of the invention to provide a new method for resolving N-acyl-DL-tryptophans. Another object is to provide a chemical method for resolving N-acyl-DL-tryptophans and for providing new and useful compounds. A further object is to provide a new resolution method employing an optically active lysine as the resolving agent. Still further objects will be apparent from the following description.

The objects of the invention are accomplished by reacting an optically active lysine with a mixture of the L- and D-isomers of an N-acyltryptophan, e. g., an N-acyl-DL-tryptophan, and separating the resulting diastereoisomers of lysine N-acyl-tryptophanate, e. g., by fractional crystallization. The optically active lysine N-acyltryptophanates formed by reaction of the optically active lysine with the N-acyl-DL-tryptophan are new and valuable compounds and constitute an important embodiment of the invention.

The above reaction is readily effected by merely mixing the acyltryptophan and lysine in solution. An aqueous solvent will generally be used and water is preferred. Following the reaction, the mixture of optically active lysine acyltryptophanates is fractionally crystallized from a suitable solvent to precipitate one of the diastereoisomers of lysine acyltryptophanate, leaving the other in the mother liquor.

The invention is specifically illustrated by the following examples.

Example 1

To a solution of 7.3 g. of 95% L-lysine in 18.7 g. of water, there was added with stirring 12.3 g. of N-acetyl-DL-tryptophan. When the latter had dissolved, 50 ml. of methanol was added. The solution was seeded by the addition of 0.5 g. of L-lysine N-acetyl-L-tryptophanate (obtained from a previous resolution) and stirred gently for 3.5 hours at 25° C. During this time the solution turned slowly into a thick slurry. The slurry was filtered and the separated crystals were washed with 35 ml. of 75% methanol (3 volumes of methanol to 1 of water), then dried. The 4.9 g. of crystals (45.0% conversion) of L-lysine N-acetyl-L-tryptophanate had a specific rotation of $[\alpha]_D^{22}=17.17$ (c.=3.6 water), compared with a value of $[\alpha]_D^{22}=3.46$ (c.=2.8 water) for L-lysine N-acetyl-DL-tryptophanate and a value of $[\alpha]_D^{22}=20.47$ (c.=5 water) for pure L-lysine N-acetyl-L-tryptophanate. These values indicate that the optical purity of the product crystals was 90%.

Example 2

N-acetyl-DL-tryptophan (12.3 g.) was dissolved in a solution of 11.2 g. (an excess) of pure L-lysine in 19.8 g. of water. The resulting solution was diluted with 78 ml. of methanol, seeded with about 1 mg. of L-lysine N-acetyl-L-tryptophanate, and stirred for 2.25 hours at 25° C. Filtration of the resulting slurry separated crystals of L-lysine N-acetyl-L-tryptophanate which after washing with a mixture of 22 ml. of methanol and 4 ml. of water and drying for 24 hours over calcium chloride in a desiccator, weighed 6.35 g. (65% conversion). The specific rotation of the product was $[\alpha]_D^{22}=16.8$ (c.=4.7 water), indicating an optical purity of 90%.

Example 3

To a solution of 8 g. of pure L-lysine in 21.8 g. of water, there were added successively 12.3 g. of N-acetyl-DL-tryptophan, 75 ml. of methanol, a finely triturated slurry of 0.5 g. of L-lysine N-acetyl-L-tryptophanate in 10 ml. of methanol, and lastly a further 5 ml. of methanol. The resulting mixture was stirred at 45° C. for 6.7 hours, then filtered. The filter cake was washed successively with 25 ml. of 92% methanol and 25 ml. of 96% methanol, then dried. The 6.29 g. of dried L-lysine N-acetyl-L-tryptophanate product (59% conversion) had a specific rotation of $[\alpha]_D^{22}=19.27$ (c.=2.9 water), indicating an optical of 96% purity.

Example 4

L-lysine N-acetyl-L-tryptophanate (5.8 g.), obtained as in the above examples and having an optical purity of 91%, was dissolved in 100 ml. of 50% methanol and the resulting solution was passed through a bed of a commercial cation-exchange resin (H+ form) of 20 to 50 mesh size. This resin was a sulfonated copolymer of styrene with about 8% of divinylbenzene. After passage of the solution through the bed, the latter was washed with water. The lysine component of the feed solution was adsorbed by the resin while the combined effluent and washings contained the acetyltryptophan component. After standing overnight, the combined effluent and washings deposited crystals of N-acetyl-L-tryptophan which were filtered off. A second crop of crystals were obtained and separated after concentrating the mother liquor under vacuum. The N-acetyl-L-tryptophan so recovered weighed 2.9 g. (an 84% yield) and had an optical purity of 93%.

A similar and equally effective way of recovering N-acetyl-L-tryptophan from L-lysine N-acetyl-L-tryptophanate is to employ the cation-exchange resin in its ammonium form. In this case, lysine is adsorbed by the resin while the effluent comprises a solution of ammonium N-acetyl-L-tryptophanate. Acidification of such a solution followed by filtration separates the acetyltryptophan.

The lysine component adsorbed on the resin (either the H+ or the NH$_4$+ form) in the above cation-exchange separation methods, is readily recovered by elution with aqueous ammonia. The aqueous ammonia eluate is then evaporated to remove the ammonia and the remaining L-lysine is recycled for reuse in the resolution.

*Example 5*

N-acetyl-L-trptophan (10 g.), obtained as described above, was boiled under reflux with 50 ml. of 2 N hydrochloric acid for 2 hours. The solution was then cooled, diluted with an equal volume of methanol and passed through a bed (2 cm. in diameter, 80 cm. high) of a commercial weakly basic anion exchange resin (free amine form) of 20 to 50 mesh size (U. S. Standard screen scale). The resin was washed successively with 300 ml. of methanol and 200 ml. of hot water. The combined effluent and washings were evaporated to dryness at about 50° C. to leave a residue of 7.4 g. (89% recovery) of L-tryptophan. Its optical purity was 96%, indicating that no appreciable racemization occurred during hydrolysis of the acetyltryptophan.

The present resolution procedure employing an optically active lysine as the resolving agent is applicable to the resolution of N-acyl-DL-tryptophans other than N-acetyl-DL-tryptophan. Thus, it can be used to resolve N-formyl-DL-tryptophan and N-propionyl-DL-tryptophan, by procedures generally similar to those illustrated in the examples.

The method is most preferably applied to the resolution of N-acetyl-DL-tryptophan using L-lysine as the resolving agent, in which case the crystalline product separated by fractional crystallization of the mixture of the lysine salts of the acetyl-tryptophan is N-acetyl-L-tryptophanate, which is itself usable as a food supplement. If desired, it can be saponified by heating with an alkali or hydrolyzed by heating with a strong mineral acid to convert it to L-tryptophan.

When the resolving agent is L-lysine, the salt precipitated during the fractional crystallization step is the L-lysine N-acyl-L-tryptophanate, the L-lysine N-acyl-D-tryptophanate remaining in the mother liquor. The L-lysine and N-acyl-D-tryptophan components of the salt in the mother liquor can be recovered by methods similar to those described above for recovering the lysine and acyltryptophan components of the lysine salt of N-acyl-L-tryptophan. The L-lysine so recovered can be recycled to the resolution step, while the N-acyl-D-tryptophan can be racemized, then recycled to the resolution step. Alternatively, the N-acyl-D-tryptophan can be converted to D-tryptophan which can be racemized and acylated (e. g. by the method of Kolb et al., J. Biol. Chem., 144, 193 (1942)), then recycled.

When the resolving agent is D-lysine, the salt that is precipitated during the fractional crystallization is D-lysine N-acyl-D-tryptophanate, the D-lysine N-acyl-L-tryptophanate remaining in solution. The lysine and N-acyltryptophan components of these salts can be recovered by procedures similar to those described above for the salts obtained when L-lysine is the resolving agent.

The fractional crystallization of the optically active salts formed in the resolution reaction can be carried out in any solvent or solvent mixture in which the two salts have different solubilities. Mixtures of water with water-miscible organic solvents such as the lower aliphatic alcohols, particularly methanol and ethanol, and the lower aliphatic ketones such as acetone, are preferred solvents. The most preferred solvents are mixtures of methanol and water in the proportions of about 3.5 to 4.5 volumes of methanol per volume of water.

The resolution can be carried out at any temperature from about 10° C. up to the boiling point of the solvent. However, at temperatures below about 35° C. the salt which separates tends to be of poorer crystallinity, e. g. of smaller crystal size which is less pure and more difficult to filter, than when higher temperatures are employed. For this reason, temperatures of at least 40° C. are preferred.

The present optically active lysine N-acyltryptophanates are new compounds. They include the L-lysine salts of N-acyl-L-tryptophans, the L-lysine salts of N-acyl-D-tryptophans, the D-lysine salts of N-acyl-L-tryptophans, and the D-lysine salts of N-acyl-D-tryptophans. Typical of these are those in which the acyl group is acetyl. Of these, the L-lysine N-acetyl-L-tryptophanate is of greatest present importance since it is biologically active and can be used for supplementing human diets which are deficient both with respect to L-lysine and L-tryptophan.

L-lysine N-acetyl-L-tryptophanate, after crystallizing and drying overnight in a vacuum at room temperature over calcium chloride, contains one mole of water per two moles of salt. This water is retained tenaciously, apparently as water of crystallization.

Analysis of this hemihydrate gave—Found: C, 57.18%; H, 6.95%—Required by $C_{19}H_{28}N_4O_5 \cdot 0.5H_2O$; C, 57.0%; H, 7.22%.

Heating under desiccating conditions removes most of the water from this hemihydrate. The hydrated salt (hemihydrate) melts at 212 to 216° C. with some decomposition. Its specific rotation is $[\alpha]_D^{22} = 20.47$ at 5% concentration in water. Its formula in the anhydrous state may be written:

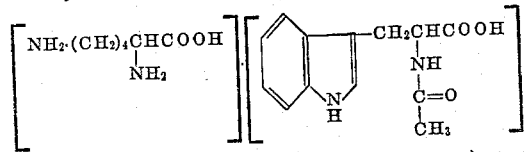

Optically active lysine, i. e. either L-lysine or D-lysine, from any source can be used as the resolving agent in practicing the present invention. A convenient way of obtaining such optically active lysine is by the method of Emmick (U. S. Patent 2,556,907) wherein racemic lysine obtained by any synthetic method can be readily resolved. Since synthetic lysine can be made and converted to an optically active form relatively cheaply, the present invention employing optically active lysine as the resolving agent provides a practical and relatively cheap way of resolving N-acyl-DL-tryptophans.

We claim:

1. The method comprising reacting an optically active lysine with a mixture of the L- and D-isomers of an N-acyltryptophan to form a mixture of optically active lysine salts of said L- and D-isomers, and separating said optically active salts by fractionally crystallizing said mixture of salts from a solvent.

2. The method comprising reacting an optically active lysine in aqueous solution with a mixture of the L- and D-isomers of an N-acyltryptophan to form a mixture of optically active lysine salts of said L- and D-isomers, and separating said optically active salts by fractionally crystallizing said mixture of salts from a solvent.

3. The method comprising reacting an optically active lysine in aqueous solution with an N-acyl-DL-tryptophan to form a mixture of optically active lysine N-acyl-tryptophanates and fractionally crystallizing said mixture from a solvent.

4. The method of claim 3 wherein the optically active lysine is L-lysine.

5. The method of claim 3 wherein the fractional crystallization is effected from an aqueous methanol solvent.

6. The method of claim 3 employing N-acetyl-DL-tryptophan.

7. The method comprising reacting L-lysine in aqueous solution with a mixture of the L- and D-isomers of N-acetyl-tryptophan and fractionally crystallizing the resulting mixture of L-lysine N-acetyl-L-tryptophanate and L-lysine N-acetyl-D-tryptophanate from a solvent.

8. The method of claim 7 wherein the fractional crystallization is effected from an aqueous methanol solvent.

9. The method of claim 8 wherein the aqueous methanol solvent is a mixture of 3.5 to 4.5 volumes of methanol per volume of water.

10. The method comprising reacting L-lysine in aqueous solution with a mixture of the L- and D-isomers of N-acetyltryptophan, fractionally crystallizing the resulting mixture of optically active salts from an aqueous methanol solvent to separate crystals of L-lysine N-acetyl-L-tryptophanate, passing an aqueous solution of said crystals through a bed of a cation-exchange resin and recovering N-acetyl-L-tryptophan from the effluent.

11. An optically active lysine N-lower alkanoyl tryptophanate.

12. An optically active lysine N-acetyl-tryptophanate.

13. An L-lysine N-lower alkanoyl-L-tryptophanate.

14. L-lysine N-acetyl-L-tryptophanate.

15. L-lysine N-acetyl-L-tryptophanate hemihydrate.

References Cited in the file of this patent

UNITED STATES PATENTS

| | | |
|---|---|---|
| 2,556,907 | Emmick | June 12, 1951 |
| 2,657,230 | Rogers | Oct. 27, 1953 |
| 2,700,672 | Morris | Jan. 25, 1955 |

FOREIGN PATENTS

| | | |
|---|---|---|
| 1,084,218 | France | July 7, 1954 |

OTHER REFERENCES

Karrer: Organic Chemistry (Elsevier, 2nd Ed.) pages 98–9 (1946).